United States Patent
Botez et al.

(10) Patent No.: US 8,430,773 B2
(45) Date of Patent: Apr. 30, 2013

(54) GUIDE OR TENSIONING RAIL IN A TRACTION DRIVE

(75) Inventors: Lucian Botez, Novi, MI (US); Jason Eaton, Livonia, MI (US); Jeffrey Hewitt, Windsor (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 163 days.

(21) Appl. No.: 12/600,359

(22) PCT Filed: Mar. 31, 2008

(86) PCT No.: PCT/EP2008/053845
§ 371 (c)(1),
(2), (4) Date: Jul. 21, 2010

(87) PCT Pub. No.: WO2008/138676
PCT Pub. Date: Nov. 20, 2008

(65) Prior Publication Data
US 2010/0292037 A1    Nov. 18, 2010

Related U.S. Application Data

(60) Provisional application No. 60/917,958, filed on May 15, 2007.

(51) Int. Cl.
*F16H 7/08* (2006.01)
(52) U.S. Cl.
USPC .......................................................... 474/111

(58) Field of Classification Search ............... 474/101, 474/109, 110, 111, 140; 403/329, 397; 411/512, 411/903; 384/276, 295
See application file for complete search history.

(56) References Cited

U.S. PATENT DOCUMENTS

| | | | | |
|---|---|---|---|---|
| 4,453,292 A | * | 6/1984 | Bakker | 24/115 G |
| 4,691,951 A | * | 9/1987 | Fildan | 292/337 |
| 4,832,664 A | * | 5/1989 | Groger et al. | 474/111 |
| 5,250,058 A | * | 10/1993 | Miller et al. | 606/154 |
| 5,526,209 A | * | 6/1996 | Ota | 360/132 |
| 6,612,952 B1 | * | 9/2003 | Simpson et al. | 474/111 |
| 6,622,828 B1 | * | 9/2003 | DeLeeuw et al. | 188/206 R |
| 6,729,764 B2 | * | 5/2004 | Kobayashi et al. | 384/295 |
| 6,755,333 B2 | * | 6/2004 | Nagasaki et al. | 226/194 |
| 7,396,183 B2 | * | 7/2008 | Contero et al. | 403/122 |
| 2006/0054121 A1 | * | 3/2006 | Koch | 123/90.17 |

FOREIGN PATENT DOCUMENTS

| | | |
|---|---|---|
| DE | 19807822 | 8/1998 |
| DE | 19913288 | 9/2000 |
| DE | 19923923 | 12/2000 |
| EP | 0856686 | 8/1998 |
| WO | 2004067999 | 8/2004 |

* cited by examiner

*Primary Examiner* — Michael Mansen
*Assistant Examiner* — Mark K Buse
(74) *Attorney, Agent, or Firm* — Volpe and Koenig, P.C.

(57) ABSTRACT

A guide or tensioning rail (1) for a traction drive is provided, with the guide or tensioning rail (1) having at least one bearing lug (4a, 4b) with a sleeve (5). In order to simplify the assembly of the rail (1) during installation of the traction drive, the sleeve (5) on one end has a radially protruding flange (10) having two opposing detent recesses (9), and two corresponding detent protrusions (13) are formed on the bearing lug (4).

8 Claims, 3 Drawing Sheets

GUIDE OR TENSIONING RAIL IN A TRACTION DRIVE

BACKGROUND

The invention relates to a guide or tensioning rail in a traction drive, wherein the guide or tensioning rail has at least one bearing lug with a sleeve.

Traction drives are used, among other things, for transmitting rotational movements in internal combustion engines. For example, the rotation of a crankshaft can be transmitted with the help of the traction mechanism to camshafts or secondary assemblies of a vehicle, wherein belts, bands, V belts, toothed belts, or chains are used as the traction mechanism. For guidance and also to keep the traction mechanism under a sufficient biasing tension, it is known that the traction mechanism is guided with the help of at least one guide rail and a force is exerted on the traction mechanism with at least one tensioning rail, wherein this force acts essentially perpendicular to its direction of movement, as well as into the center of the traction drive. For this purpose, the guide rails are typically mounted rigidly to another component, for example, an engine block. The tensioning rails are loaded with a spring force or by a hydraulic force and keep the traction mechanism under a sufficient biasing tension, optionally also as a function of the rotational speed of the traction mechanism, in order to prevent, among other things, jumping of the traction mechanism from a driving wheel.

A tensioning rail for a chain drive is known, for example, from DE 199 13 288 A1. It is formed from an elongated and hollow base body that is filled with a metal foam. Here, the tensioning rail can be mounted on an engine block via a bolt that passes through a receptacle borehole. The production of such a tensioning rail, however, requires considerable manufacturing-related expense due to the foaming.

Furthermore, DE 199 23 923 A1 discloses a tensioning rail that has available a bearing lug in which a metal sleeve is arranged. If the base body of the tensioning rail is produced, for example, from plastic, then, with the metal sleeve in the bearing lug, damage to the tensioning rail when fastening to an engine block or the like is prevented, because the metal sleeve is significantly more stable than the plastic material of the tensioning rail. For this purpose, the metal sleeve can be pressed or sunk into the bearing lug or extrusion coated with plastic.

Here, it is to be viewed as disadvantageous that additional tools are required, for example, for an ultrasonic fusing process, for inserting the sleeve into the bearing lug, so that the tensioning rail can also be produced only with considerable expense.

SUMMARY

The invention is based on the objective of providing a guide or tensioning rail for a traction drive that can be produced, nevertheless, in an easy way, for sufficient fatigue strength.

The invention is based on the knowledge that an advantageously metallic sleeve can be engaged or locked in a bearing lug of a guide or tensioning rail in a simple way, in order to considerably simplify the assembly as well as the production process. For this purpose, the sleeve with an essentially hollow cylindrical construction is designed such that, on one end, a radially protruding flange or a collar-shaped shoulder is constructed. In this protruding flange, two opposing detent recesses are formed that interact with corresponding detent projections that are formed on the bearing lug of the guide or tensioning rail.

For assembly, the sleeve is introduced from one side into the bearing lug, wherein the detent projections on the bearing lug or the free end of the sleeve on which no radially protruding flange is formed can be optionally provided with bevels, in order to simplify the introduction of the sleeve into the bearing lug. The sleeve is introduced until the catch projections are engaged in the detent recesses of the flange or the sleeve. Thus, the sleeve could be locked in the bearing lug without additional tools or processing methods. In particular, no additional fixed welding of the sleeve in the bearing lug is needed, for example, with the help of an ultrasonic welding process. The outer diameter of the essentially hollow cylindrical sleeve is designed such that the sleeve can be easily inserted into the bearing lug. It is understood that the detent recesses and the detent projections could also be provided on the other component, respectively, or distributed on both components.

Furthermore, it is also possible that only one detent recess or more than two detent recesses, for example, three or four detent recesses are formed in the flange, wherein a matching number of corresponding detent projections are formed on the bearing lug. If more than two detent recesses or detent projections are provided, then these are advantageously arranged distributed equidistantly around the periphery of the flange or the bearing lug.

According to one improvement of the invention, it is provided that the guide or tensioning rail is made from a plastic material and the sleeve is made from a metal or a metallic alloy. Here, the sleeve is constructed with technically appropriate dimensions, in order to prevent destruction of the sleeve during the assembly of the guide or tensioning rail, for example, on an engine block or during proper operation. For this purpose, a threaded bolt or the like could be guided through the sleeve and screwed into a correspondingly dimensioned threaded borehole in the engine block. Accordingly, the significant holding forces that are transmitted from the threaded bolt to the guide or tensioning rail or the sleeve are received by the sleeve.

In order to guarantee the correctly positioned introduction of the sleeve into the bearing lug and thus to simplify the assembly, on the outer periphery of the sleeve, flat, axially oriented guide surfaces are formed that interact with corresponding flat, axially oriented guide surfaces on the inside of the bearing lug. Thus it is guaranteed that the sleeve can be introduced into the bearing lug only such that, when inserted, a flat guide surface on the outer periphery of the sleeve directly contacts the corresponding flat guide surface of the bearing lug. In particular, these flat guide surfaces are allocated to the detent recesses and detent projections, respectively, so that the detent projections can be brought into reliable engagement in the detent recesses.

In order to be able to install the guide or tensioning rail in arbitrary positions so that it is fixed in place and can pivot, this has available two bearing lugs, wherein one bearing lug is penetrated by a threaded bolt for fastening to a stationary component, while, in the other bearing lug, a coupling element can engage the guide or tensioning rail for the application of force.

For the compensation of tolerances and also for the correct adjustment, for example, of the guide or tensioning rail on an engine block, at least one of the bearing lugs is constructed as an elongated hole, in order to be able to move the sleeve back and forth with this elongated hole at least to a minimal degree. If the guide or tensioning rail is later mounted on the engine block, e.g., with the help of a threaded bolt, then through a slight back and forth movement of the sleeve in the elongated hole and through the later tightening of the threaded bolt, measurement tolerances can be compensated. In principle, two or more bearing lugs could also be constructed as elongated holes, wherein, in the case of two bearing lugs, an arrangement of the elongated holes oriented perpendicular to each other is provided.

In the same way, for the fine adjustment and also for the compensation of dimensional errors, the outer diameter of the sleeve can be selected slightly smaller than the inner diameter of the bearing lug, in order to provide a certain amount of play during the assembly. This difference, however, should not be selected too large, in order to prevent tilting of the sleeve within the bearing lug.

Furthermore, in the same way the length of the sleeve viewed in the axial direction can be selected slightly smaller than the depth of the bearing lug or the width of the guide or tensioning rail. Advantageously, in this way it is provided that this difference in length equals at least 0.5% of the maximum length of the sleeve or the minimum depth of the bearing lug under consideration of the production tolerances. At most, this length difference should be selected to be 5% of the minimum height of the sleeve or the maximum depth of the bearing lug under consideration of the production tolerances. For such dimensioning it is guaranteed that the plastic material is not destroyed under the axial loading of a threaded bolt guided through the sleeve.

If, for example, in the case of such a configuration, a threaded bolt is placed through the sleeve, in order to screw down the guide or tensioning rail with the threaded bolt so that it is fixed in position, then, during tightening, the head of the threaded bolt first contacts the plastic or synthetic material of the guide or tensioning rail, because this projects axially slightly past the metallic sleeve. For further tightening, this plastic material is slightly compressed until the threaded bolt contacts the end side of the advantageously metallic sleeve that obviously has a significantly higher strength than the plastic of the guide or tensioning rail.

Now if the threaded bolt is tightened with a sufficient torque, then the plastic material of the guide or tensioning rail is slightly pressurized, wherein, according to the previously described differences in height of the individual components, not too large a pressure is exerted on this plastic material, so that destruction of the plastic material is prevented. In addition, through this construction it is achieved that no interfering vibrations are produced in the guide or tensioning rail during the operation, because the plastic material is pressed in a sufficient degree, for example, onto the engine block, by the threaded bolt head.

According to one alternative configuration, it is proposed that the length of the sleeve viewed in the axial direction is selected slightly greater than the depth of the bearing lug or the width of the guide or tensioning rail. This could also be constructed with the previously described differences in length. Such a construction is possible if vibrations of the guide or tensioning rail that is made, for example, from plastic, are not relevant in practice. During the assembly of the guide or tensioning rail, the threaded bolt is guided through the sleeve and screwed tight in a threaded borehole. Because the advantageously metallic sleeve is higher or longer than what corresponds to the width of the guide or tensioning rail, a head of the threaded bolt contacts merely the sleeve, so that the guide or tensioning rail is not compressed in practice. Thus, no force is exerted onto the guide or tensioning rail viewed in the axial direction of the threaded bolt.

Due to the simple geometric construction of the sleeve that is formed essentially by a cylindrical body with a protruding flange at one end, this can also be produced economically. In particular, a powder metallurgy method can be used, in order to produce such sleeves economically in mass production and with sufficient tolerances. For this purpose, metals or metal alloys could be used with grain sizes of, for example, below 0.6 mm, which could be shaped into the desired form in corresponding molds or pressing tools. Then a sintering process is performed by the heat treatment. In principle, such a sleeve could also be produced by a powder injection-molding method.

BRIEF DESCRIPTION OF THE DRAWINGS

The invention will be explained in greater detail below using an embodiment with reference to the accompanying drawing. Shown therein are.

DETAILED DESCRIPTION OF THE PREFERRED EMBODIMENTS

Figure 1:
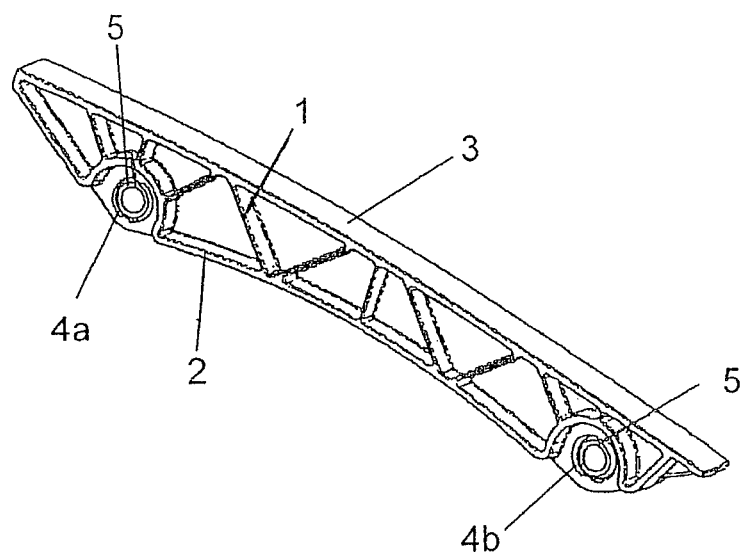
FIG. 1 is a perspective view of a guide rail, wherein a sleeve is inserted into the bearing lugs of the guide rail.

The guide rail 1 shown in FIG. 1 is made from a lattice-shaped base body 2 made from a plastic as well as a contact surface 3 along which a traction mechanism can slide, for example, a chain for a camshaft drive. In principle, such a guide rail 1 can also be used for exerting a biasing tension onto the traction mechanism, wherein it is then supported as a tensioning rail so that it can pivot about a bearing point and is pressed with a force in the direction toward the traction mechanism by an actuator or a compression spring that can be activated by pressurized medium.

Furthermore, the guide rail 1 has available two bearing lugs 4a and 4b in each of which a metallic sleeve 5 is inserted. For fastening the tensioning rail 1, for example, to an engine block of a motor vehicle, for example, not-shown threaded bolts are guided through the sleeves 5 and screwed, e.g., into threaded boreholes in the engine block.

Figure 2:
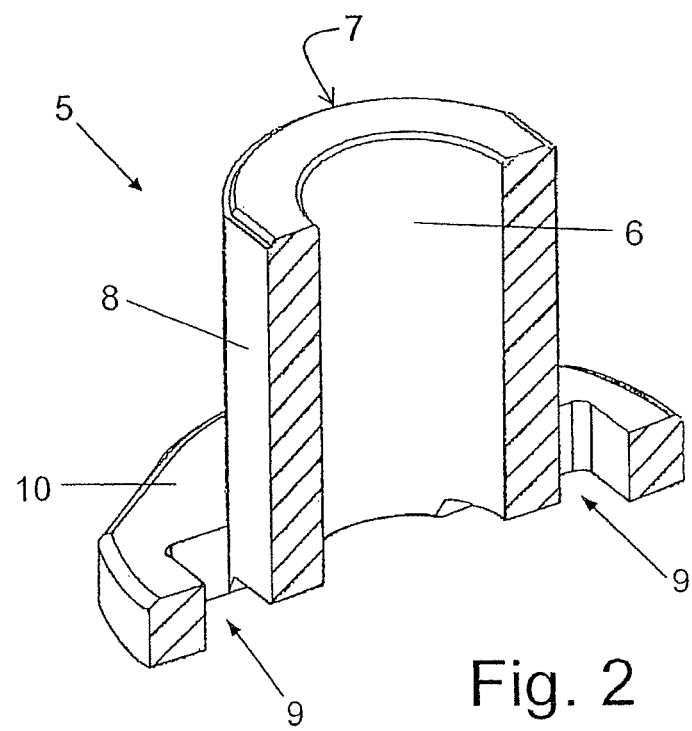
FIG. 2 is a perspective, cross-sectional view of a sleeve according to FIG. 1.

In FIG. 2, such a sleeve 5 is shown in a perspective section view. The advantageously metallic sleeve 5 has an essentially hollow cylindrical geometry with an inner cylindrical surface 6 and an outer cylindrical surface 7. The sleeve 5 is constructed with a corresponding material thickness, in order to be able to withstand the resulting operating loads. On the outer cylindrical surface 7, two opposing flat guide surfaces 8 are formed to each of which detent recesses 9 are allocated. The detent recesses 9 are formed in a flange 10 that projects radially past the sleeve 5 and that could also be designated as a shoulder-like collar. The detent recesses 9 are constructed such that they can interact with the detent projections 13 described below on a bearing lug 4.

Figure 3A:
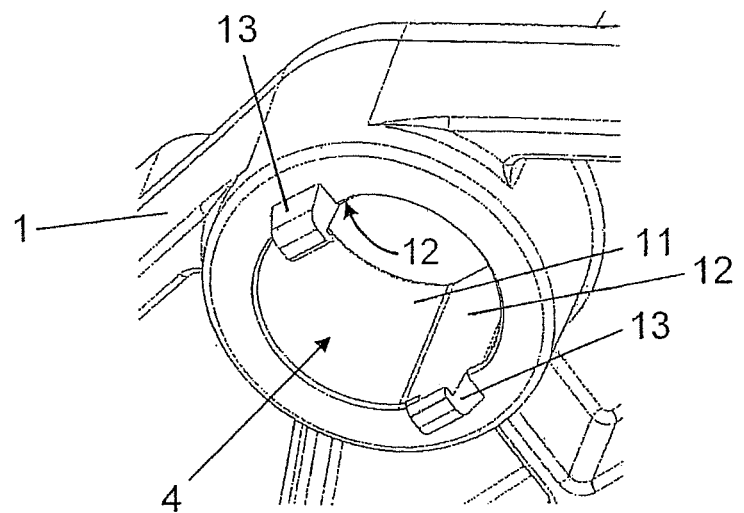
FIG. 3a is a perspective view of a bearing lug of the guide rail according to FIG. 1.
Figure 3B:
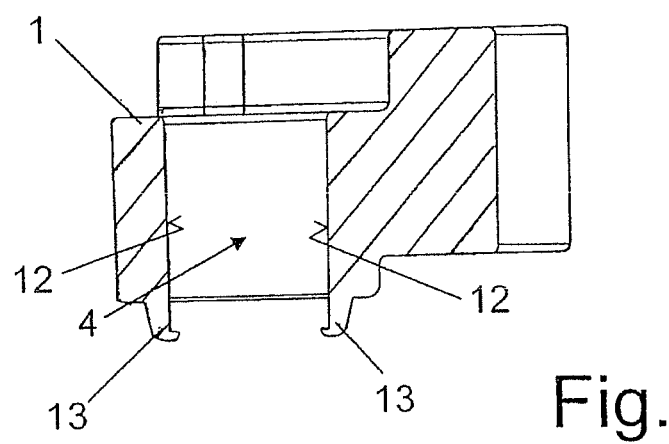
FIG. 3b is a cross-sectional view of the bearing lug according to FIG. 3a, FIG. 4a is a top view of a sleeve inserted into the guide rail.

In FIGS. 3a and 3b, the bearing lug 4 of the tensioning rail 1 is shown in a perspective view or in a cross section. The bearing lug 4 has available an essentially cylindrical inner wall 11, wherein, in this cylindrical inner wall 11, two opposing flat guide surfaces 12 are formed that interact with the flat guide surfaces 8 noted above on the outer cylindrical surface 7 of the sleeve 5, such that the sleeve 5 can be inserted into the bearing lug 4 only with the correct positioning. Thus it is guaranteed that the detent projections 13 on the bearing lug 4 can be brought directly in engagement with the detent recesses 9 of the sleeve 5. On the detent projections 13 or the detent recesses 9, as shown, corresponding bevels can be formed, in order to simplify the introduction of the sleeve 5 into the bearing lug 4. In the assembled state, the detent recesses 9 in the flange 10 are engaged by beak-shaped, radially inward pointing projections of the detent projections 13, in order to fix the sleeve 5 in the bearing lug 4. In particular, additional tools or aids are needed, in order to reinforce a bearing lug 4 of the plastic guide rail 1 with a metallic sleeve 5 and thus to protect the entire guide rail 1 from damages.

Figure 4A:
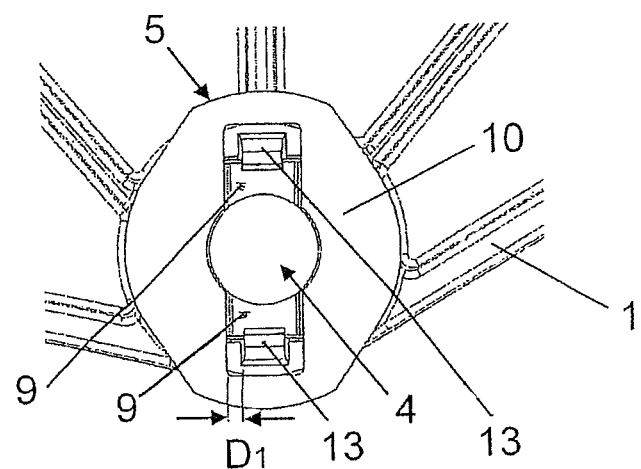
FIG. 4b is a cross-sectional view of the sleeve from FIG. 4a inserted into the guide rail.
Figure 4B:
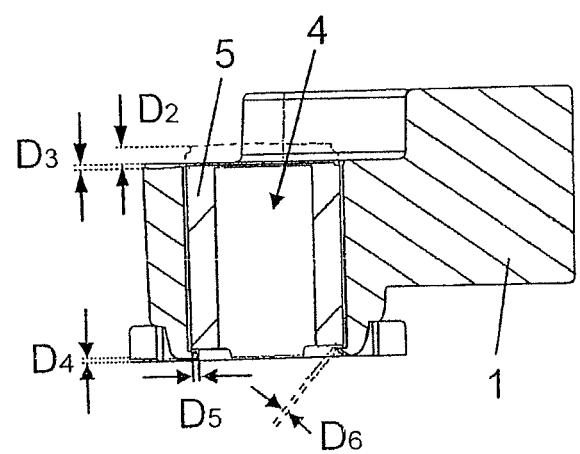

In FIGS. 4a and 4b, the sleeve 5 inserted into the bearing lug 4 is shown, in one case, in a top view, and, in one case, in a cross section. Here, according to FIG. 4a, the detent projections 13 are engaged in the detent recesses 9 of the flange 10 of the sleeve 5, wherein the width of the detent projections 13 can be selected slightly smaller than the width of the detent recess 9. This is indicated in FIG. 4a by the difference arrow D1, in order to still have sufficient play when the sleeve 5 is inserted into the bearing lug 4.

Likewise, as is shown by the difference arrows D2, D3, D4, and D5 in FIG. 4b, tolerances or play is provided between the outer diameter of the sleeve 5 and the inner diameter of the bearing lug 4, as well as, as already briefly explained farther above, between the height of the sleeve 5 and the depth of the bearing lug 4.

For example, if the sleeve 5 is slightly shorter than what corresponds to the depth of the bearing lug 4 (length difference D3), then, when a threaded bolt is screwed in for fastening the guide or tensioning rail 1, first the head or a contact shoulder of the threaded bolt comes in contact with the plastic material of the guide rail 1 and at least slightly compresses the plastic material for further tightening of the threaded bolt. This takes place until the advantageously similarly metallic threaded bolt is led into contact on the end face of the sleeve 5 and thus the guide rail 1 is fixed overall. Here, not too large a pressure is exerted on the plastic material of the tensioning rail 1 by the threaded bolt, so that, in particular, the guide rail 1 is not damaged structurally. However, this axial offset or the tolerance D3 is advantageously selected with a size or length such that the guide rail 1 is pressed with a sufficient holding force, in order to prevent vibrations of the tensioning rail 1 on the holding point.

In the case of a different structural shape, according to the length difference D2, the sleeve 5 could also be constructed axially longer than the bearing lug 4.

Likewise, certain preferred tolerances D4, D5, and D6 are provided, in order, on one hand, to have sufficient play between the detent projection 13 and the detent recess 9 in the radial and axial directions and in order, on the other hand, to fix the sleeve 5 securely in each bearing lug 4.

The sleeve 5 could advantageously be produced in a powder metallurgical method due to its simple construction.

LIST OF REFERENCE SYMBOLS

1 Guide rail, tensioning rail
2 Base body
3 Contact surface
4a Bearing lug, circular
4b Bearing lug, elongated-hole-shaped
5 Sleeve
6 Inner cylindrical surface of the sleeve
7 Outer cylindrical surface of the sleeve
8 Flat guide surface on the sleeve
9 Detent recess
10 Flange
11 Cylindrical inner wall of the bearing lug
12 Flat guide surface in the bearing lug
13 Detent projection
$D_1$-$D_6$ Tolerance, play

The invention claimed is:

1. Guide or tensioning rail in a traction drive, comprising at least one bearing lug with a sleeve slidably received therein, the sleeve has, at one end, a radially protruding flange with two opposing detent recesses defined therein and two corresponding detent projections are formed on the at least one bearing lug that retain the sleeve in the at least one bearing lug.

2. Guide or tensioning rail according to claim 1, wherein the guide or tensioning rail is made from plastic and the sleeve is made from a metal.

3. Guide or tensioning rail according to claim 2, wherein the sleeve is formed from a powder metal.

4. Guide or tensioning rail according to claim 1, wherein flat guide surfaces are formed on the sleeve and flat guide surfaces are formed on the at least one bearing lug in a region of the detent recesses and in a region of the detent projections, respectively.

5. Guide or tensioning rail according to claim 1, wherein the guide or tensioning rail has a1 two of the at least one bearing lugs of which one of the two bearing lugs has an elongated-hole-shaped construction.

6. Guide or tensioning rail according to claim 1, wherein an outer diameter of the sleeve is slightly smaller than an inner diameter of the at least one bearing lug.

7. Guide or tensioning rail according to claim 1, wherein an axial length of the sleeve is slightly smaller or greater than a depth of the at least one bearing lug.

8. Guide or tensioning rail according to claim 1, wherein the guide or tensioning rail has a two-part construction with a base body a2 having the at least one bearing lug and a second component having a contact surface for contacting the traction mechanism, and the base body and the second component are connected rigidly to each other.

* * * * *